US009785134B2

(12) United States Patent
Chou et al.

(10) Patent No.: US 9,785,134 B2
(45) Date of Patent: Oct. 10, 2017

(54) FAN DUTY CONTROL FOR MULTI-NODE COMPUTING DEVICE

(71) Applicant: Quanta Computer Inc., Gueishan Dist., Taoyuan (TW)

(72) Inventors: Le-Sheng Chou, Taoyuan (TW); Sz-Chin Shih, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 270 days.

(21) Appl. No.: 14/641,945

(22) Filed: Mar. 9, 2015

(65) Prior Publication Data
US 2016/0266560 A1 Sep. 15, 2016

(51) Int. Cl.
*G05B 19/042* (2006.01)
*G05B 19/10* (2006.01)

(52) U.S. Cl.
CPC ......... *G05B 19/042* (2013.01); *G05B 19/106* (2013.01); *G05B 2219/25425* (2013.01)

(58) Field of Classification Search
CPC ............................ G05B 19/042; G05B 19/106
USPC ....................................................... 700/300
See application file for complete search history.

(56) References Cited

U.S. PATENT DOCUMENTS

| 2002/0059533 A1* | 5/2002 | Kaminski | G06F 1/206 713/300 |
| 2007/0297893 A1* | 12/2007 | Alon | F04D 25/166 415/47 |
| 2009/0006901 A1* | 1/2009 | Brey | G06F 1/206 714/47.1 |
| 2010/0033120 A1* | 2/2010 | Wang | G06F 1/206 318/471 |
| 2012/0288377 A1* | 11/2012 | Hartman | F01P 7/042 417/13 |
| 2015/0192937 A1* | 7/2015 | Govindarajan | G05B 15/02 700/275 |

FOREIGN PATENT DOCUMENTS

CN          1758170 A      4/2006

OTHER PUBLICATIONS

Taiwanese Office Action for Application No. 104121357, dated Jun. 1 2017 w/ First Office Action Summary.

* cited by examiner

*Primary Examiner* — Vincent Tran
(74) *Attorney, Agent, or Firm* — Nixon Peabody LLP; Eduardo J. Quinones

(57) ABSTRACT

Embodiments generally relate to thermal management in a multi-node computing device. The present technology discloses techniques that can receive multiple control signals from multiple computing nodes, each of the control signals being associated with a fan duty request, which is a request for a fan duty needed to keep a related computing node operating within a predetermined temperature range. The logic controller can rank the received control signals and select a control signal that requests a highest fan duty; lastly, the logic controller can cause multiple cooling fans to operate at the selected highest fan duty.

17 Claims, 6 Drawing Sheets

FAN DUTY CONTROL FOR MULTI-NODE COMPUTING DEVICE

FIELD OF THE INVENTION

The disclosure relates generally to thermal management in a computing device.

BACKGROUND

Modern computing devices are comprised of numerous electronic components such as CPUs, GPUs, RAM, etc. As computing devices grow more powerful (e.g., a multi-node server), more heat is generated by these electronic components. Excessive heat in a computing device can cause physical damage to the electronic components and lead to data loss as well as system failures.

Cooling fans are widely utilized to remove heat from computing devices by actively exhausting accumulated hot air, thus maintaining an acceptable temperature for system operation. Effective control of the cooling fan speed is required to keep the internal temperature within a predetermined range. For example, an insufficiently low fan speed results in poor air circulation and overheating of the computing device; conversely, an unnecessarily high fan speed causes overcooling of the device and a waste of energy.

SUMMARY

The present technology provides effective control of the fan duty using a logic controller. A fan duty is the volume of air to be moved by fan at a specified total pressure ($P_t$). A fan duty may be, for example, measured in percentage (%). The present technology can regulate a fan duty to change a fan speed as a fan duty is linearly proportional to a fan speed. For example, a fan duty ranges from 0% to 100%, corresponding to a fan speed varying from a minimum speed to a maximum speed. An example of the logic controller is a complex programmable logic device (CPLD) that implements an optimized approach to determine a fan duty of computer fans.

According to some embodiments, the logic controller can receive multiple control signals from multiple computing nodes, each of the control signals being associated with a fan duty request, which is a request for a fan duty needed to keep a related computing node operating within a predetermined temperature range. The logic controller can rank the received control signals and select a control signal that requests a highest fan duty; lastly, the logic controller can cause multiple cooling fans to operate at the selected highest fan duty.

The present technology further enables effective fan duty control in a multi-thermal zone computing device, using a logic controller. For example, the computing device can include thermal zone #1 having a first group of computing nodes that are cooled by one group of cooling fans. The computing device can further include thermal zone #2 having a second group of computing nodes that are cooled by another group of cooling fans. According to some embodiments, a logic controller of the computing device can receive a first group of control signals related to thermal zone #1, and a second group of control signals related to thermal zone #2. The logic controller can respectively rank the first group of control signals and the second group of control signals to determine the highest fan duty request in each thermal zone. The logic controller can further respectively cause the first group of computer fans to operate at a speed corresponding to the highest fan duty request in thermal zone #1, and the second group of computer fans to operate at another speed corresponding to the highest fan duty request in thermal zone #2.

Additionally, by dividing the cooling fans into different thermal groups and allowing each group of cooling fans to operate at a different fan duty according to the thermal requirement, the present technology enables an optimized fan control to achieve cooling flexibility and power efficiency.

Additionally, even though the present discussion uses fan duty control as an example of to enable cooling in the computing device, the present technology is conceptually applicable to other cooling methods, e.g., flow speed control in liquid cooling, or other cooling device control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Figure 1:
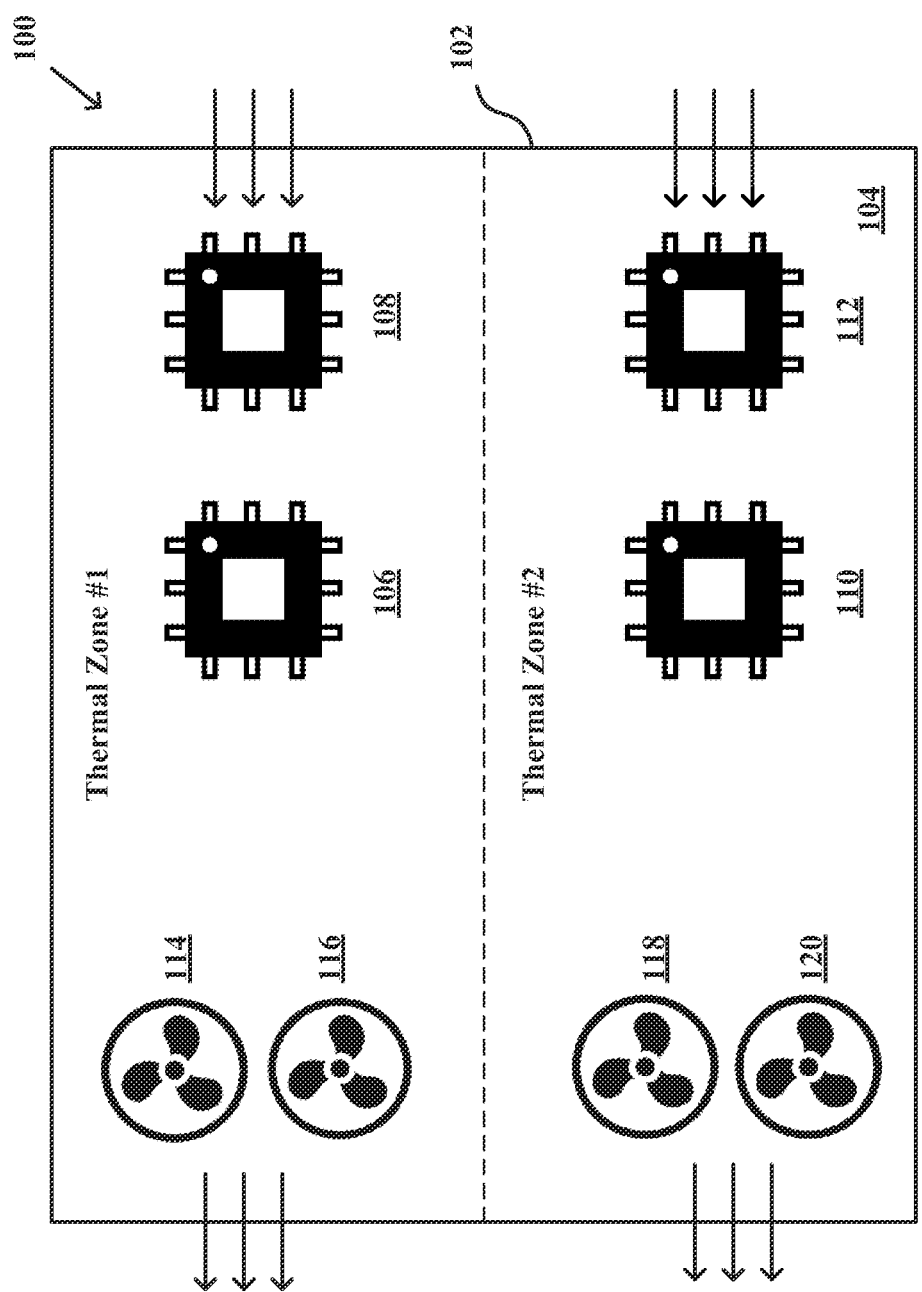
FIG. 1 illustrates an example of a multi-node fan duty control system, according to some embodiments.

Various embodiments of the present technology are discussed in detail below. While specific implementations are discussed, it should be understood that this is done for illustration purposes only. A person skilled in the relevant art will recognize that other components and configurations may be used without parting from the spirit and scope of the present technology.

High-density, multi-node computing devices are ideal for computing efficiency and flexibility. For example, the four computing nodes in a two-unit computing device can either work individually or cooperate with each other, offering computing flexibility corresponding to a client's demand. Additionally, the four computing nodes can share power supplies and cooling fans, providing optimized power and cooling efficiencies.

Heat management is critical for multi-node computing devices as the high-density computing structure creates a significant amount of heat in a limited chassis space. Conventionally, a microprocessor, such as a Chassis Management Controller (CMC), determines the cooling fan duty via a complex and algorithm-based procedure.

For example, the CMC needs first to receive thermal data from each of the computing nodes, compare the received thermal data, and, lastly, determine an appropriate fan duty by a fan mapping in which one or more cooling fans are correlated to one or more heat-generating components in the computing device. Thus, the conventional technology is prone to unnecessary errors in thermal data collection, thermal data comparison and fan mappings.

Thus, there is a need to provide a simple and effective control of the cooling fans to optimize the thermal management of a computing device.

The present technology enables an effective and simple control of the fan duty of a computing device using a logic controller. According to some embodiments, the logic controller can receive multiple control signals from multiple computing nodes, each of the control signals being associated with a fan duty request, which is a request for a fan duty needed to keep a related computing node operating within a predetermined temperature range. The logic controller can rank the received control signals and select a control signal that requests a highest fan duty. Lastly, the logic controller can cause cooling fans to operate at the highest fan duty.

The present technology further can enable an effective fan duty control in a multi-thermal zone computing device, using a logic controller. For example, the computing device can include thermal zone #1 having a first group of computing nodes that are cooled by one group of cooling fans. The computing device can further include thermal zone #2 having a second group of computing nodes that are cooled by another group of cooling fans. According to some embodiments, the computing device can receive a first group of control signals related to thermal zone #1, and a second group of control signals related to thermal zone #2; the computing device can respectively rank the first group of control signals and the second group of control signals to determine the highest fan duty request in each thermal zone; the computing device can further cause the first group of computer fans to operate at a speed corresponding to the highest fan duty request in thermal zone #1, and the second group of computer fans to operate at another speed corresponding to the highest fan duty request in thermal zone #2. Additionally, the computing device can include and manage multiple thermal zones pursuant to techniques described herein.

According to some embodiments, the multiple thermal zones can be static zones that are grouped and divided by physical components such as air ducts. According to some embodiments, the multiple thermal zones can be dynamic zones that are constantly regrouped according to the thermal requirements of the computing nodes. For example, when the computing device detects a computing node generating a substantial amount of heat, a thermal zone #1 including the heated computing node can be defined and created. Accordingly, multiple fan duty relating to thermal zone #1 can be increased to remove the accumulated heat around the computing node. This dynamic zoning approach can enable the computing device to flexibly adjust the fan duty according to the actual thermal need of each computing node.

Furthermore, by dividing the cooling fans into different thermal groups and allowing each group of cooling fans to operate at a different fan duty, the present technology enables an optimized fan control to achieve cooling flexibility and power efficiency.

According to some embodiments, the present technology can utilize different fan control methods to control the fan duty. Examples of the fan control methods include linear voltage regulation, pulse width modulation (PWM), and software control.

According to some embodiments, the present technology can use a logic controller (e.g., a complex programmable logic device (CPLD)) to determine a fan duty based on a highest fan duty request via ranking the fan duty requests. A logic controller is an independent and embedded device that is responsible for controlling fan duty. Thus, the present technology eliminates a microprocessor and a complex algorithm used to determine an appropriate fan duty.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example of a multi-node fan duty control system 100, according to some embodiments. Fan duty control system 100 can include a computing device 102 that includes a chassis 104, multiple computing nodes (e.g., 106, 108, 110 and 112) each comprising multiple heat-generating components such as CPUs, GPUs and chipsets (not shown), and multiple cooling fans (e.g., 114, 116, 118 and 120).

According to some embodiments, each of the computing nodes (e.g., 106, 108, 110 and 112) includes a CPU, a temperature sensor (i.e. thermal diode temperature sensor) for measuring an actual temperature of the computing node, and a fan duty integrated circuit (e.g., baseboard management controller, not shown) for generating a fan duty request based on the temperature difference between an actual temperature and a predetermined operation temperature range (e.g., 25° C. to 55° C.).

According to some embodiments, the one or more cooling fans (e.g., 114, 116, 118 and 120) can actively exhaust hot air from chassis 104 in one of a front-to-back airflow, a side-to-side airflow, or a back-to-front airflow. In a front-to-back airflow as shown in FIG. 1, the cooling fans (e.g., 114, 116, 118 and 120) can pull hot air through chassis 104 to control the internal temperature within a predetermined range (e.g., 25° C. to 55° C.). The speed of pulling the hot air from chassis 104 can depend on a selected fan duty and its corresponding fan speed.

Still referring to FIG. 1, various fan control mechanisms can be used to change a fan duty according to heat accumulated in chassis 104. Typical fan control mechanisms include linear voltage regulation, pulse width modulation (PWM), and software controls that are well known to those of ordinary skill in the art.

For example, in a PWM fan control method, a temperature sensor can detect an actual temperature of 60° C. in computing node 106 and send the actual temperature to the fan duty integrated circuit. The fan duty integrated circuit can generate a fan duty request based on the temperature difference between the actual temperature of 60° C. and a predetermined operation temperature range (e.g., 25° C. to 55° C.). Additionally, each of the computing nodes 106, 108, 110 and 112 can have different actual temperatures as each of them has a different computation load. Thus, the fan duty request associated with each computing node can be different, ranging from a low fan duty request from a low-temperature computing node to a high fan duty request from a high-temperature computing node.

According to some embodiments, fan duty control system 100 can use a logic controller to rank and select a highest fan duty request. Furthermore, the fan duty control system 100 can cause cooling fans (e.g., 114, 116, 118 and 120) to operate at a fan speed corresponding to the highest fan duty request.

Furthermore, fan duty control system 100 can divide chassis 104 into one or more thermal zones (e. g. Thermal Zone #1 and Thermal Zone #2) for more precise fan duty control. According to some embodiments, each of the thermal zones can have a different highest fan duty request. For example, Thermal Zone #1 can have computing node 106 with an actual temperature of 60° C. and computing node 108 with an actual temperature of 45° C. Pursuant to technology described herein, Thermal Zone #1 can adopt a highest fan duty request that is generated by computing node 106, and apply the highest fan duty request to all cooling fans (e.g., 114 and 116) in Thermal Zone #1. Meanwhile, Thermal Zone #2 can have computing node 110 with an actual temperature of 70° C. and computing node 112 with an actual temperature of 35° C. Accordingly, Thermal Zone #2 can adopt a highest fan duty request generated by computing node 110 and apply the highest fan duty request to all cooling fans (e.g., 118 and 120) in thermal zone #2. Thus, by dividing the cooling fans into different groups and allowing each group to operate at a different fan duty according to its thermal needs, the present technology enables an optimized fan control method for cooling efficiency.

Figure 2:
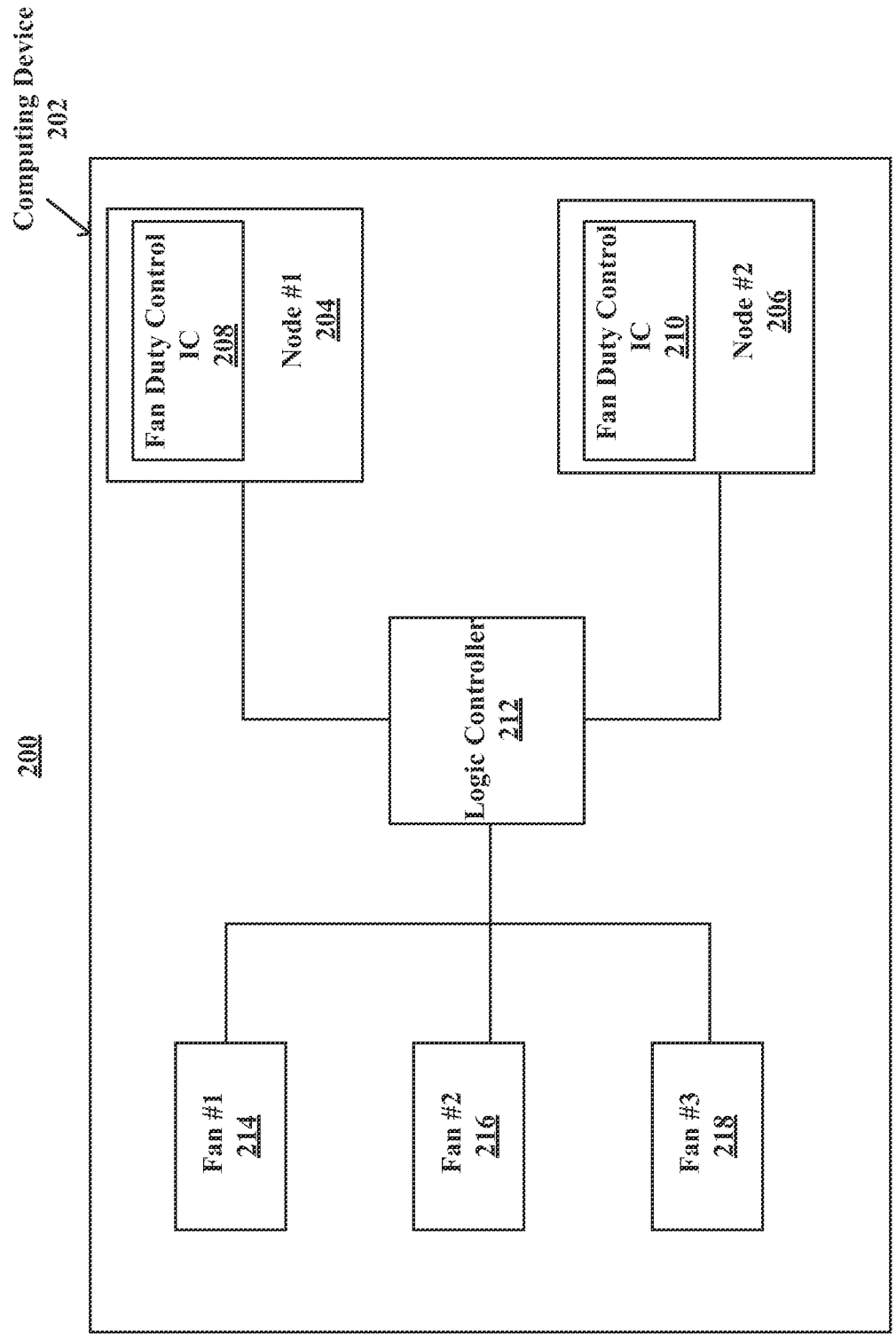
FIG. 2 is a block diagram illustrating an example of a multi-node fan duty control system, according to some embodiments.

FIG. 2 is a block diagram illustrating an example of a multi-node fan duty control system 200, according to some embodiments. As shown in FIG. 2, a multi-node Computing Device 202 can include at least Node #1 204 and its associated Fan Duty Control Integrated Circuit (Fan Duty Control IC) 208, and Node #2 206 and its associated Fan Duty Control Integrated Circuit 210, a Logic Controller 212 and one or more cooling fans (e.g., Fan #1 214, Fan #2 216 and Fan #3 218). An example of a fan control integrated circuit is a BMC (baseboard management controller). A baseboard management controller (BMC) is an independent and embedded microcontroller that in some embodiments is responsible for the management and monitoring of the main CPU, firmware and operating system. According to some embodiments, the BMC can monitor the server's hardware components by receiving data from sensors installed in the chassis, e.g., fan speeds, CPU temperature, power consumption level, etc.

According to some embodiments, each of Node #1 204 and Node #2 206 can further include a CPU (not shown), and a temperature sensor (not shown) that measures an actual temperature of the node. According to some embodiments, the temperature sensor can couple to the die of a CPU and provide a CPU die temperature. According to other embodiments, the temperature sensor can couple to a motherboard of Node #1 204 or Node #2 206, and provide a motherboard temperature. For example, Fan Duty Integrated Circuit 208 can receive an actual temperature of Node #1 204 from the temperature sensor, compare the actual temperature of Node #1 204 with a predetermined operation temperature range of Node #1 204 (e.g., 25° C. to 55° C.), and generate a fan duty request. The fan duty request can correspond to a fan duty that provides an effective amount of air exhaustion to control the actual temperature of Node #1 204 within the predetermined operation temperature range.

Additionally, the fan duty request generated by Fan Duty Integrated Circuit 208 can correspond to a control signal configured to control the duty of one or more cooling fans (e.g., 214, 216 and 218). For example, a type of control signal is a pulse width modulation (PWM) that can control a fan duty by PWM pulses with variable PWM duty cycle. Additionally, there is a relationship between the duty cycle of PWM pulses and the duty of a fan. According to some embodiments, PWM pulses have duty cycles ranging from 30% to 100%, in which the 30% PWM duty cycle corresponds to the minimum fan duty and the 100% PWM duty cycle corresponds to the maximum fan duty.

According to some embodiments, Logic Controller 212 can be an embedded and independent controller for fan duty control. An example of Logic Controller 212 is a CPLD. According to some embodiments, Logic Controller 212 can receive a first PWM signal corresponding to a fan duty request of node #1 204, and a second PWM signal corresponding to a fan duty request of node #2 206. Logic Controller 212 can rank the two PWM signals based on either its PMW duty cycle or its corresponding fan duty request. After the ranking, Logic Controller 212 can select one PWM signal associated with a higher PWM duty cycle or a higher fan duty request. Furthermore, Logic Controller 212 can cause Fan #1 214, Fan #2 216 and Fan #3 218 to operate at a fan duty corresponding to the selected PWM signal.

Furthermore, Logic Controller 212 can send fan speed tachometer signals to Fan Control Integrated Circuit 208 and 210 to provide fan speed feedback. The fan speed tachometer signals indicate whether the cooling fan is running and its speed Additionally, Computing Device 202 can include more nodes in addition to node #1 204 and node #2 206 that can share cooling fan #1 214, cooling fan #2 216 and cooling fan #3 218 via the techniques described herein. A node or a computing node is an independent computing unit comprising a main CPU, a memory, a temperature sensor, and/or other components.

Figure 3:
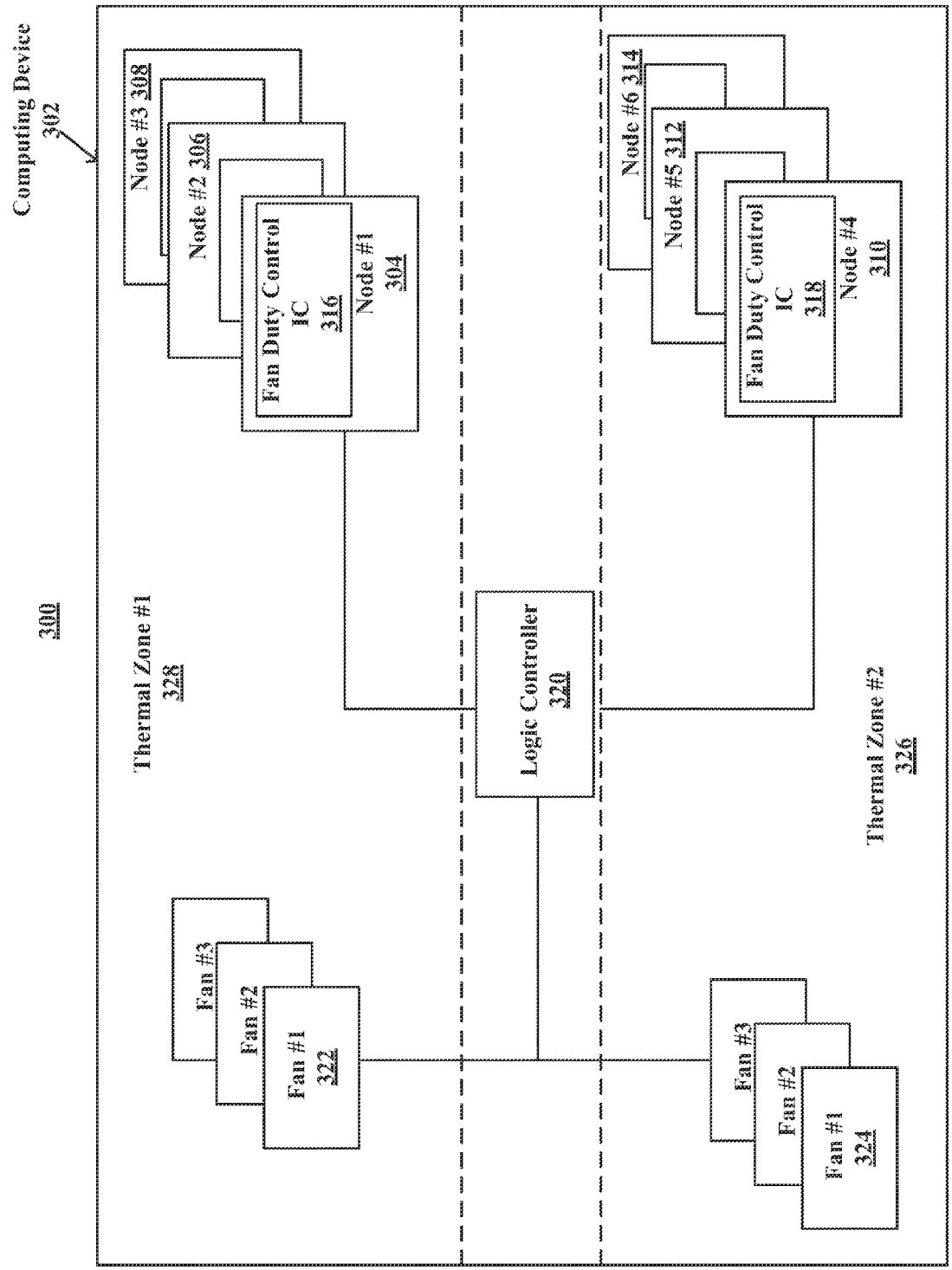
FIG. 3 is another block diagram illustrating another example of a multi-node fan duty control system, according to some embodiments.

FIG. 3 is a block diagram illustrating an example of a multi-node fan duty control system 300, according to some embodiments. As shown in FIG. 3, a Computing Device 302 can include Thermal Zone #1 328 and Thermal Zone #2 326. Thermal Zone #1 328 can include at least Node #1 304 and its associated Fan Duty Control Integrated Circuit 316, Node #2 306 and its associated Fan Duty Control Integrated Circuit, and Node #3 308 and its associated Fan Duty Control Integrated Circuit. Thermal Zone #1 328 can further include one more fans (e.g., Fan#1 322, Fan #2 and Fan #3). As shown in FIG. 3. Thermal Zone #2 326 can include at least Node #4 310 and its associated Fan Duty Control Integrated Circuit 318, Node #5 312 and its associated Fan Duty Control Integrated Circuit, and Node #6 314 and its associated Fan Duty Control Integrated Circuit. Thermal Zone #2 326 can further include one more fans (e.g., Fan #1 324, Fan #2 and Fan #3).

According to some embodiments, each of Node #1 304, Node #2 306, Node #3 308 can include a CPU (not shown), and a temperature sensor (not shown) that measures an actual temperature of the node. According to some embodiments, the temperature sensor can couple to the die of a CPU and provide a CPU die temperature. According to other embodiments, the temperature sensor can couple to the motherboard of a node, and provide a motherboard temperature. According to some embodiments, each node, using a separate fan control integrated circuit, can generate fan duty request according to its thermal requirement. For example, Fan Duty Integrated Circuit 316 (e.g., a BMC) can receive an actual temperature of Node #1 304 from the temperature sensor, compare the actual temperature of Node #1 304 with a predetermined operation temperature range of Node #1 304 (e.g., 25° C. to 55° C.), and generate a fan duty request. The fan duty request can correspond to a fan duty that provides an effective amount of air exhaustion to control the actual temperature of Node #1 304 within the predetermined operation temperature range.

Additionally, the fan duty request generated by Fan Duty Integrated Circuit 316 can comprise a control signal configured to control the fan duty of one or more fans (e.g., Fan #1 324, Fan #2 and Fan #3). For example, a type of control signal is a pulse width modulation (PWM) that can control a fan duty by PWM pulses with variable PWM duty cycle. Additionally, there is a relationship between the duty cycle of PWM pulses and the duty of a fan. According to some embodiments, PWM pulses have duty cycles ranging from 30% to 100%, in which the 30% PWM duty cycle corresponds to the minimum fan duty and the 100% PWM duty cycle corresponds to the maximum fan duty.

Furthermore, Computing Device 302 can include a Logic Controller 320 for controlling fan duties. According to some embodiments, Logic Controller 320 can receive a group of fan duty request from the computing nodes in Thermal Zone #1 328 and another group of fan duty requests from the computing nodes in Thermal Zone #2 326.

According to some embodiments, each of the thermal zones can have a different highest fan duty request. For example, Thermal Zone #1 328 can have Node #1 304 reporting an actual temperature of 60° C. and node #2 306 reporting an actual temperature of 45° C. Pursuant to techniques described herein, Thermal Zone #1 328 can adopt the highest fan duty request generated by Node #1 304 and apply the highest fan duty request to all fans (e.g., Fan #1 322, Fan #2 and Fan #3) associated with Thermal Zone #1 328. Meanwhile, Thermal Zone #2 326 can have Node #4 310 reporting an actual temperature of 70° C. and Node #5 reporting an actual temperature of 35° C. Accordingly, Thermal Zone #2 326 can adopt the highest fan duty request generated by Node #4 310 and apply the highest fan duty request to all fans (e.g., Fan #1 324, Fan #2 and Fan #3) in Thermal Zone #2 326. Thus, by dividing the cooling fans into two thermal groups (Thermal Zone #1 328 and Thermal Zone #2 326) and allowing each group to operate at a different fan duty pursuant to its thermal needs, the present technology enables an optimized fan control method to improve fan flexibility and power efficiency.

According to some embodiments, Logic Controller 320 can provide fan speed feedback (e.g., tachometer signals) to each of the nodes in Thermal Zone #1 328 and Thermal Zone #2 326. For example, the fan speed tachometer signals can indicate whether the cooling fan is running and its speed.

Still referring to FIG. 3, according to some embodiments, Thermal Zone #1 328 and Thermal Zone #2 326 can be static zones that are grouped and divided by physical components (e.g. air ducts (not shown)). According to some embodiments, Thermal Zone #1 328 and Thermal Zone #2 326 are dynamic zones that can be constantly regrouped according to the thermal requirements of computing nodes. For example, when Computing Device 302 detects Node #1 304 generating a substantial amount of heat, Thermal Zone #1 328 including Node #1 304 can be defined and created. Accordingly, for example, fan duty of Fan #1 322 that relates to Thermal Zone #1 328 can be increased to remove the accumulated heat around Node #1 304. Meanwhile, other fans (e.g. Fan #1 324, Fan #2) that do not relate to Thermal Zone #1 328 can maintain its original fan duty. This dynamic zoning approach can enable the computing device to flexibly adjust the fan duty according to the actual thermal need of each computing node.

Figure 4:
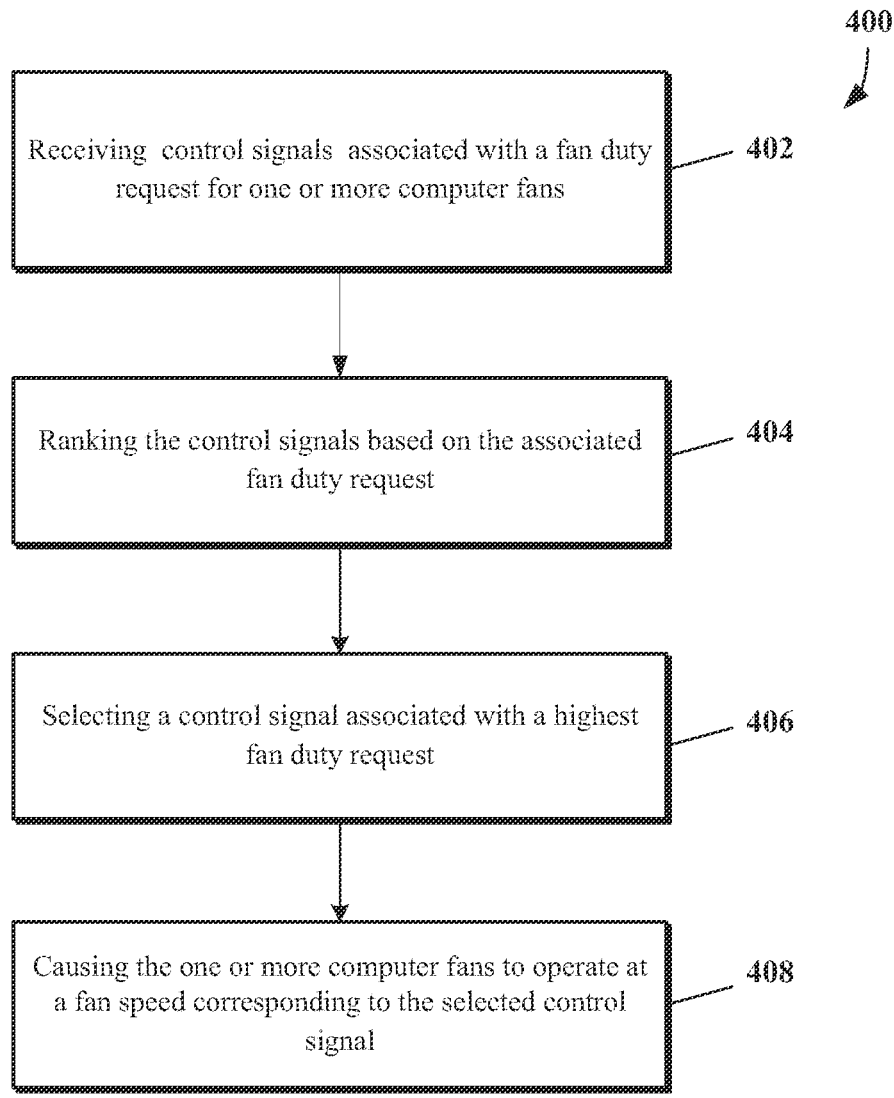
FIG. 4 is an example flow diagram for a multi-node fan control system, according to some embodiments.

FIG. 4 is an example flow diagram 400 for a multi-node fan duty control system, according to some embodiments. It should be understood that there can be additional, fewer, or alternative steps performed in similar or alternative orders, or in parallel, within the scope of the various embodiments unless otherwise stated. At step 402, a logic controller can receive a plurality of control signals, each of the plurality of control signals being associated with a fan duty request for one or more computer fans. For example, a logic controller can receive a group of pulse width modulation (PWM) signals that are configured to regulate a fan duty by varying a duty cycle of a pulse width modulation signal.

At step 404, the logic controller can rank the plurality of control signals based at least in part on the associated duty request of the one or more computer fans. For example, the logic controller can rank the group of PWM signals based on either its PMW duty cycle or its corresponding fan duty request.

At step 406, the logic controller can select a control signal associated with a highest fan duty request. For example, after the ranking, the logic controller can select a PWM signal associated with a highest PWM duty cycle or a highest fan duty request.

At step 408, the logic controller can cause the one or more computer fans to operate at a fan speed corresponding to the selected control signal. For example, the logic controller can transmit the selected PWM signal to the one or more computer fans so that the computer fans can operate at a fan speed corresponding to the selected PWM signal.

Figure 5:
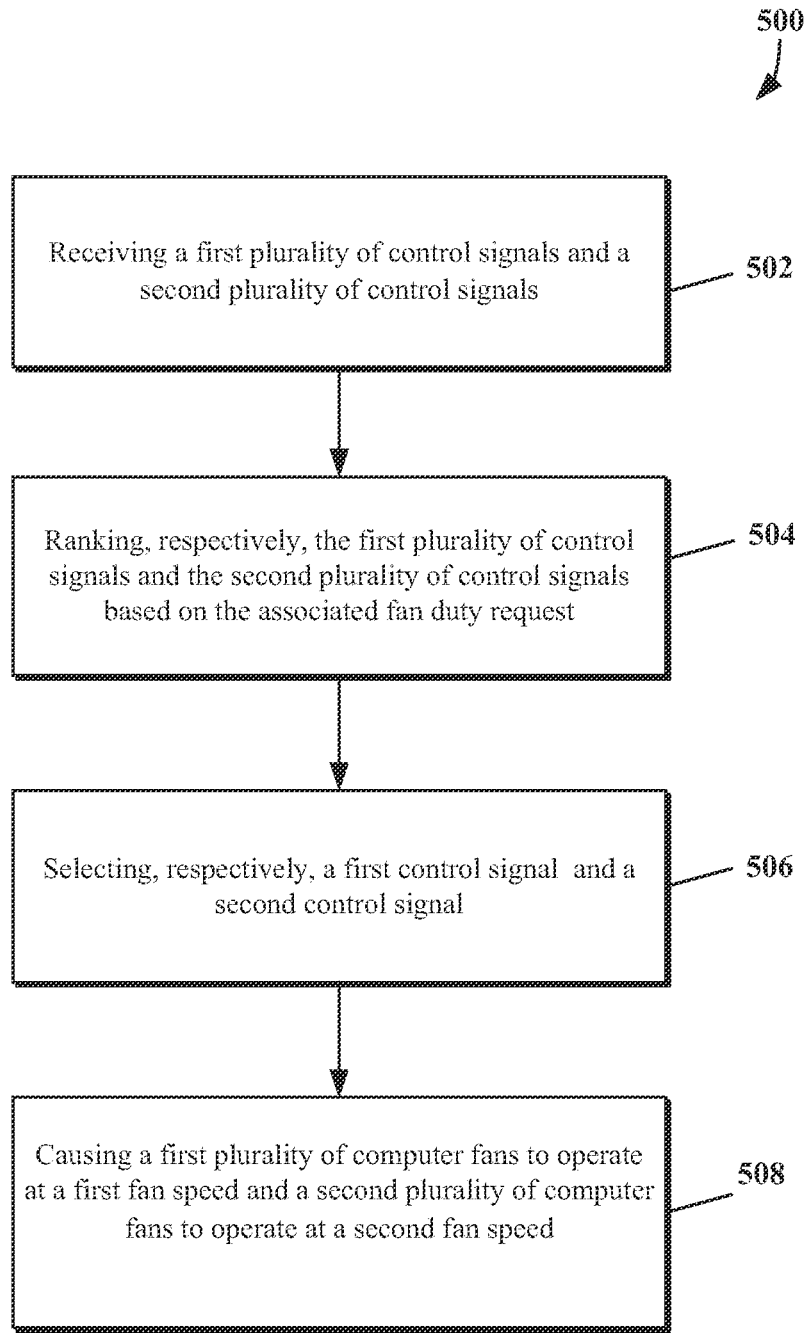
FIG. 5 is another example flow diagram for a multi-node fan control system, according to some embodiments.

FIG. 5 is another example flow diagram for a multi-node fan duty control system 500, according to some embodiments. It should be understood that there can be additional, fewer, or alternative steps performed in similar or alternative orders, or in parallel, within the scope of the various embodiments unless otherwise stated. At step 502, a logic controller can receive a first plurality of control signals and a second plurality of control signals, each of the first plurality of control signals being associated with a fan duty request for a first plurality of computer fans in a first thermal zone, and each of the second plurality of control signals being associated with a fan duty request for a second plurality of computer fans in a second thermal zone. For example, a logic controller can receive a first group of pulse width modulation (PWM) signals from a group of nodes in thermal zone #1, and a second group of pulse width modulation (PWM) signals from a group of nodes in thermal zone #2. At step 504, the logic controller can rank, respectively, the first plurality of control signals and the second plurality of control signals, based at least in part on the associated fan duty request for the first plurality of computer fans and the second plurality of computer fans. For example, the logic controller can rank the first group of PWM signals and the second group of PWM signals separately based on either its PMW duty cycle or its corresponding fan duty request.

At step 506, the logic controller can select, respectively, a first control signal associated with a highest fan duty request for the first plurality of computer fans and a second control signal associated with a highest fan duty request for the second plurality of computer fans. For example, after the ranking, the logic controller can select a first PWM signal associated with a highest PWM duty cycle or a highest fan duty request for thermal zone #1 and a second PWM signal associated with a highest PWM duty cycle or a highest fan duty for thermal zone #2.

At step 508, the logic controller can cause the first plurality of computer fans to operate at a first fan speed corresponding to the first control signal and the second plurality of computer fans to operate at a second fan speed corresponding to the second control signal. For example, the logic controller can transmit the selected first PWM signal to the computer fans in thermal zone #1 so that the computer fans can operate at a fan speed corresponding to the selected first PWM signal. The logic controller can transmit the selected second PWM signal to the computer fans in thermal zone #2 so that the computer fans can operate at a fan speed corresponding to the selected second PWM signal.

Figure 6:
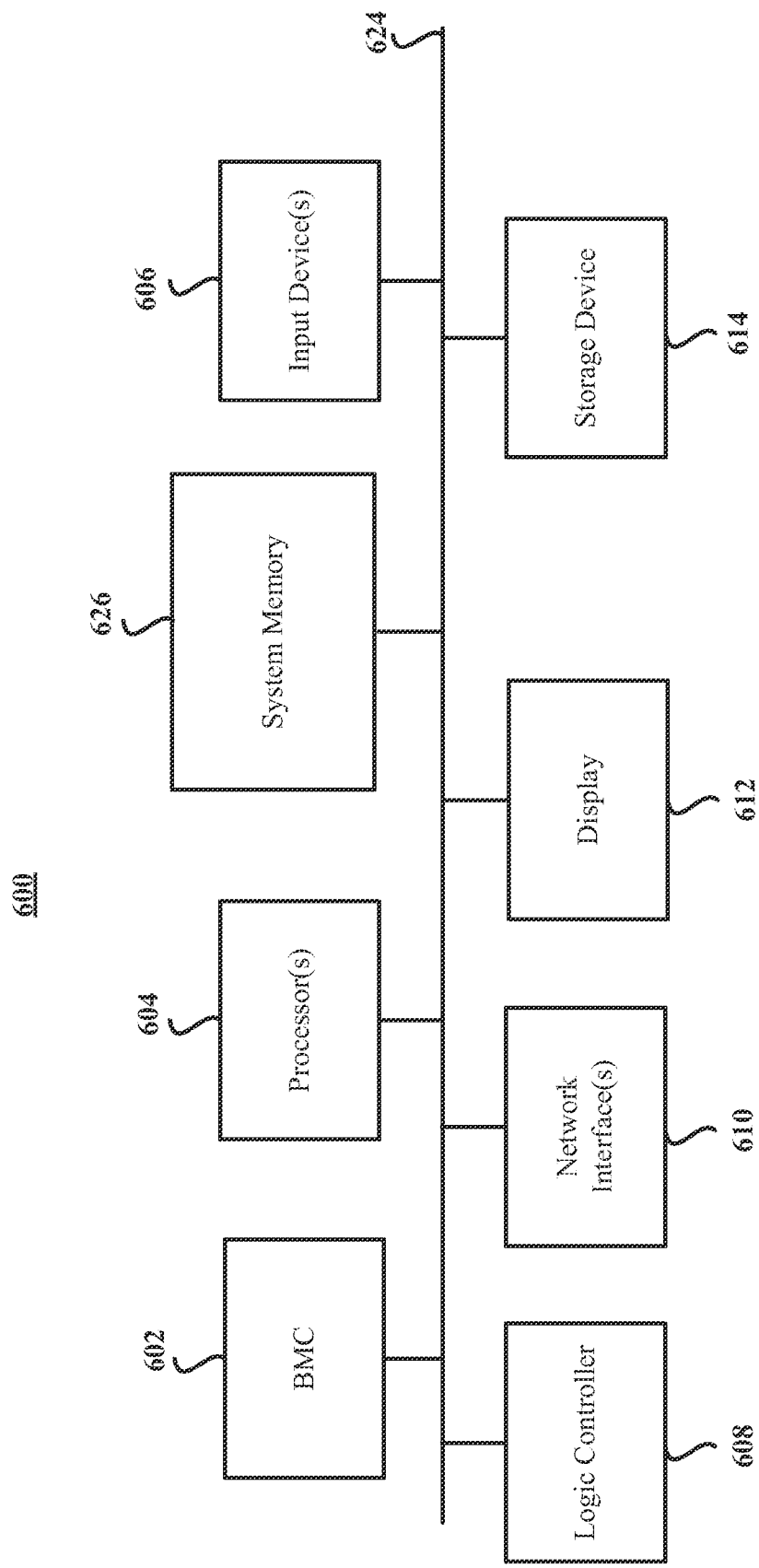
FIG. 6 illustrates an exemplary computing platform disposed a computing device, according to some embodiments.

FIG. 6 illustrates an example system architecture 600 for implementing the systems and processes of FIGS. 1-5. Computing platform 600 includes a bus 624 which interconnects subsystems and devices, such as BMC 602, processor 604, storage device 614, system memory 626, a network interface(s) 610, logic controller 608. Processor 604 can be implemented with one or more central processing units ("CPUs"), such as those manufactured by Intel® Corporation, or one or more virtual processors, as well as any combination of CPUs and virtual processors. Computing platform 600 exchanges data representing inputs and outputs via input-and-output devices input devices 606 and display 612, including, but not limited to, keyboards, mice, audio inputs (e.g., speech-to-text devices), user interfaces, displays, monitors, cursors, touch-sensitive displays. LCD or LED displays, and other I/O-related devices.

According to some examples, computing architecture 600 performs specific operations by processor 604 executing one or more sequences of one or more instructions stored in system memory 626. Computing platform 600 can be implemented as a server device or client device in a client-server arrangement, peer-to-peer arrangement, or as any mobile computing device, including smart phones and the like. Such instructions or data may be read into system memory 626 from another computer readable medium, such as storage device 614. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks and the like. Volatile media includes dynamic memory, such as system memory 626.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 624 for transmitting a computer data signal.

In the example shown, system memory 626 can include various modules that include executable instructions to implement functionalities described herein. In the example shown, system memory 626 includes a log manager, a log buffer, or a log repository, each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method of controlling computer fans, comprising:
receiving, at a logic controller of a computing device, a plurality of control signals, each of the plurality of control signals being associated with a corresponding fan duty request for one or more computer fans;
ranking the plurality of control signals, based at least in part on associated fan duty requests;
selecting a particular control signal from the plurality of control signals, the particular control signal associated with a particular fan duty request with a highest fan duty; and
sending the particular control signal to the one or more computer fans such that the one or more fans operate at a fan speed corresponding to the highest fan duty.

2. The method of claim 1, wherein the computing device includes one or more fan control integrated circuits, each associated with a computing node of one or more computing nodes of the computing device, and wherein each of the one or more fan control integrated circuits generates one control signal of the plurality of control signals.

3. The method of claim 2, further comprising:
transmitting, using the logic controller, one or more fan speed tachometer signals to the one or more fan control integrated circuits.

4. The method of claim 2, wherein the computing device includes one or more temperature sensors, each associated with a computing node of one or more computing nodes of the computing device, and wherein each of the one or more temperature sensors operates to measures an actual temperature of the associated computing node.

5. The method of claim 1, wherein the plurality of control signals comprise pulse width modulation signals that operate to regulate a fan duty of the one or more computer fans.

6. The method of claim 1, wherein the computing device includes one or more computing nodes, and wherein each of the one or more computing nodes operates to generate one control signal of the plurality of control signals.

7. A method of controlling computer fans, comprising:
receiving, at a logic controller of a computing device, a first plurality of control signals and a second plurality of control signals, each of the first plurality of control signals being associated with a corresponding fan duty request for a first plurality of computer fans in a first thermal zone, and each of the second plurality of control signals being associated with a corresponding fan duty request for a second plurality of computer fans in a second thermal zone;
ranking, respectively, the first plurality of control signals and the second plurality of control signals, the ranking based at least in part on associated fan duty requests for the first plurality of computer fans and the second plurality of computer fans;

selecting a first control signal from the first plurality of control signals, the first control signal associated with a first fan duty request with a highest fan duty among the fan duty requests for the first plurality of computer fans;

selecting a second control signal from the second plurality of control signals, the second control signal associated with a second fan duty request with a highest fan duty among the fan duty requests for the second plurality of computer fans;

sending the first control signal to the first plurality of computer fans such that the first plurality of computer fans operate at a first fan speed corresponding to the first control signal; and sending the second control signal to the second plurality of computer fans such that the first plurality of computer fans operate at a second fan speed corresponding to the second control signal.

8. The method of claim 7, wherein the computing device includes a first plurality of fan control integrated circuits, each associated with a computing node of a first plurality of computing nodes in the first thermal zone, and wherein each of the first plurality of fan control integrated circuits operates to generate a control signal of the first plurality of control signals, and wherein the computing device includes a second plurality of fan control integrated circuits, each associated with a computing node of a second plurality of computing nodes in the second thermal zone, and wherein each of the second plurality of fan control integrated circuits operates to generate a control signal of the second plurality of control signals.

9. The method of claim 8, wherein the first thermal zone includes a first plurality of computing nodes, each of the first plurality of computing nodes operating to generate a control signal of the first plurality of control signals, and wherein the second thermal zone includes a second plurality of computing nodes, each of the second plurality of computing nodes operating to generate a control signal of the second plurality of control signals.

10. The method of claim 7, wherein the computing device includes one or more temperature sensors, each associated with a computing node of one or more computing nodes of the computing device, and wherein each of the one or more temperature sensors operates to measure an actual temperature of the associated computing node.

11. The method of claim 7, wherein the first plurality of control signals comprises pulse width modulation signals that operate to regulate a fan duty of the first plurality of computer fans, and wherein the second plurality of control signals comprises pulse width modulation signals that operate to regulate a fan duty of the second plurality of computer fans.

12. The method of claim 7, wherein each of the first thermal zone and the second thermal zone is one of a plurality of thermal zones in the computing device.

13. A fan control system, comprising:
a plurality of computing nodes;
a plurality of computer fans;
a logic controller, the logic controller being configured to:
receive a plurality of control signals, each of the plurality of control signals being associated with a corresponding fan duty request for the plurality of computer fans;
rank the plurality of control signals, based at least in part on associated fan duty requests;
select a particular control signal from the plurality of control signals, the particular control signal associated with a particular fan duty request with a highest fan duty; and
send the particular control signal to the plurality of computer fans such that the plurality of computer fans operate at a fan speed corresponding to the highest fan duty.

14. The fan control system of claim 13, wherein the plurality of control signals comprises pulse width modulation signals that operate to regulate a fan duty of the plurality of computer fans.

15. The fan control system of claim 13, wherein each of the plurality of computer fans is located in one or more thermal zones of the computing device.

16. The fan control system of claim 13, wherein each of the plurality of computing operates to generate one control signal of the plurality of control signals.

17. The fan control system of claim 13, wherein the logic controller is further configured to:
transmit one or more fan speed tachometer signals to the plurality of computing nodes.

* * * * *